INVENTORS.
THORPE DRESSER
JERRY A. YARBROUGH

BY

ATTORNEYS.

INVENTORS.
THORPE DRESSER
JERRY A. YARBROUGH

BY McLean and Dibble
ATTORNEYS.

United States Patent Office 3,324,626
Patented June 13, 1967

3,324,626
PROCESS FOR THE RECOVERY OF HELIUM
Thorpe Dresser, Markham, and Jerry A. Yarbrough, Calumet City, Ill., assignors to Sinclair Research, Inc., New York, N.Y., a corporation of Delaware
Filed Dec. 3, 1964, Ser. No. 415,770
2 Claims. (Cl. 55—16)

The present invention relates to a process for the recovery of helium in high purity from other gases with which it is in admixture. In a preferred embodiment, the invention is directed to the separation of helium from naturally-occurring gases wherein it is present as, for instance, natural gas.

Figure 1:
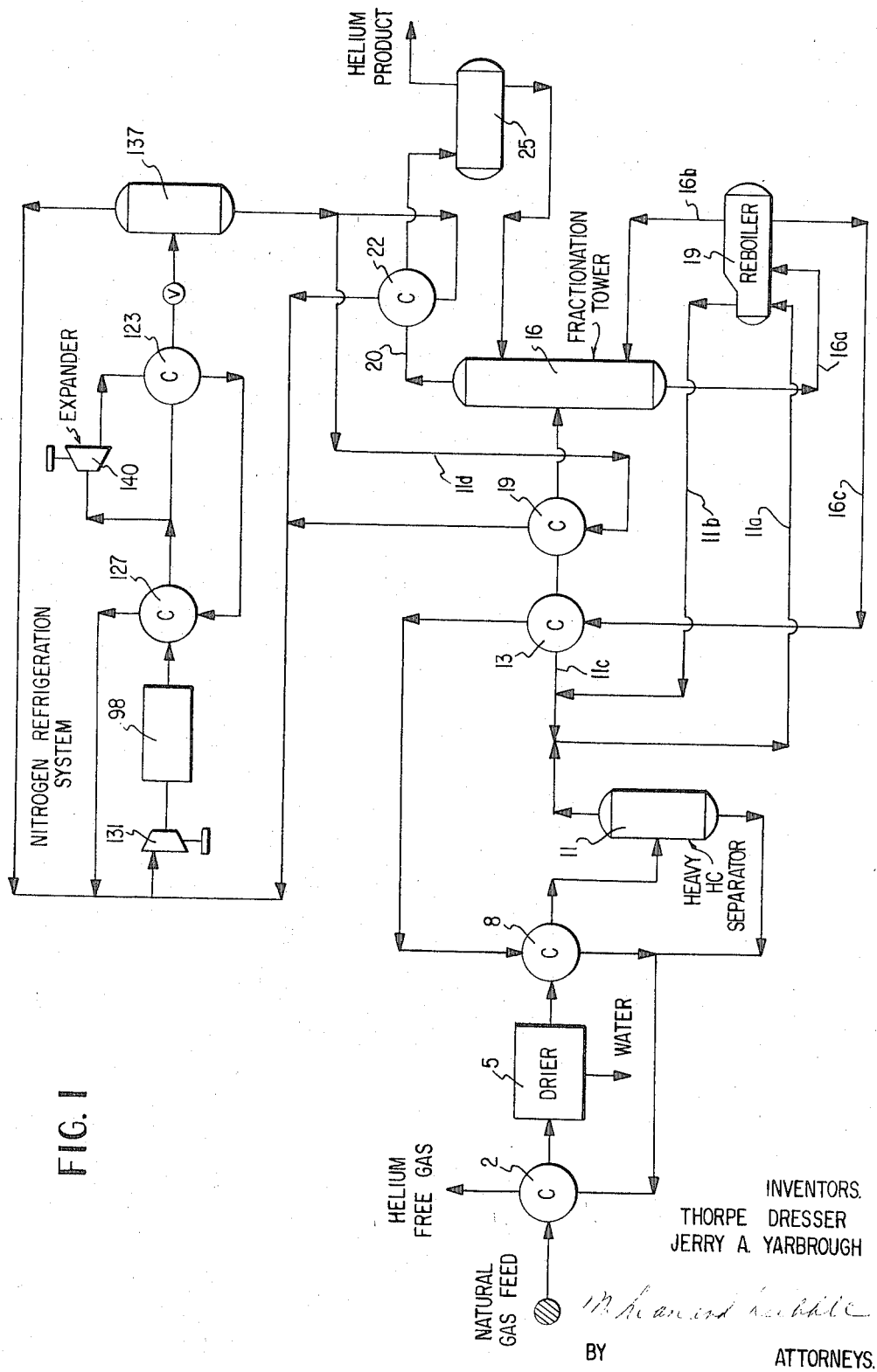
FIGURE 1 represents a conventional fractionation process for recovering helium from a natural gas stream. The fractionation process of FIGURE 1 is like any refinery fractionation except for details related to the exceptionally cold temperatures.

Referring to FIGURE 1, natural gas feed at about 1000 p.s.i.g. containing 0.2 to 3.0 volume percent helium is cooled against tail gas in cooler 2, dried in drier 5, then cooled again against tail gas in cooler 8. Heavy hydrocarbons are knocked out of the cooled gas in separator 11 to keep them from plugging cold exchangers. Part of the cool gas out of the heavy hydrocarbon separator 11 is passed via lines 11a and 11b to reboiler 19 to heat the very cold (about −250° F.) bottoms of fractionator 16. The total gas stream in line 11c is cooled further in cooler 13 against the bottoms from fractionation tower 16, partially condensed in cooler 19 against liquid nitrogen refrigerant in line 11d from the nitrogen refrigerant system which operates essentially as described below with reference to FIGURE 2 and then fed to fractionation tower 16. Helium in line 20 is cooled in cooler 22 and is sent to separator 25 from which a helium product of 99+% purity is obtained overhead. Light hydrocarbons and nitrogen go out of tower 16 as bottoms in line 16a and are directed to reboiler 19, and after removal and return to tower 16 of residual helium by line 16b, are transported in line 16c and exchanged against feed in cooler 13 as noted. Tower 16 operates at about −350° F. and 1000 p.s.i.g.

The major disadvantage of the FIGURE 1 process is that the entire natural gas stream must be cooled, dried, and piped, even though helium constitutes only about 1.0 volume percent of the total stream. All of the equipment is excessively large compared to the product stream size, particularly the nitrogen refrigeration system. Large equipment means large heat loss, further burdening the refrigeration system. Very large exchangers are required to handle the 99+ volume percent tail gas. It is expensive to add area to already huge exchangers in order to decrease ΔT, so sensible heat must be thrown away in the tail gas, which, of course, increases refrigeration load even more. In short, some way of debulking the natural gas stream looks very desirable.

Figure 2:
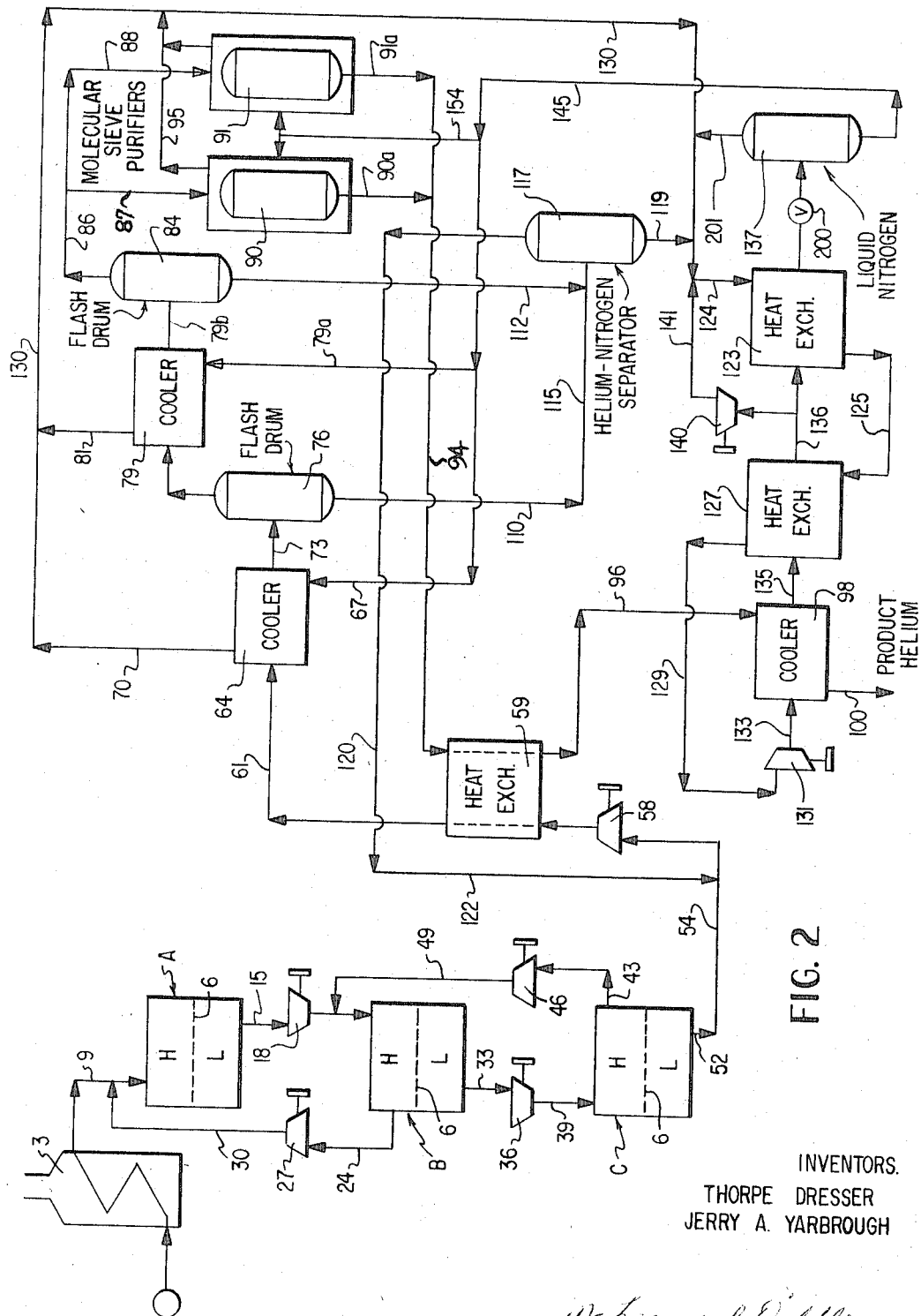
FIGURE 2 represents the process of the present invention, that is a combination permeation-fractionation process.

In the combination permeation-fractionation process of the present invention as represented by FIGURE 2, the first step of the process is debulking the total feed using a permeation process, then the second step is purifying the crude helium using essentially the purification system of the FIGURE 1 process.

Permeation alone is not a good way to purify helium because the number of stages required goes up rapidly as purity passes 90 volume percent. Since each stage requires multiple compressors, operating expenses soon outrun product value. The permeation process shown in FIGURE 2 is economically attractive when used in the combination of the invention, especially since improvements in the permeation process is highly beneficial to the overall recovery system and such advances now seem impossible when using only the method of FIGURE 1.

In a typical process according to FIGURE 2, natural gas feed at about 900 p.s.i.g. and containing about 1.3 volume percent helium enters the first permeation cell A. The permeate stream is about 10 volume percent helium. The permeate stream is compressed in compressor 18 and sent into the second permeation cell B, from which about 25 volume percent helium permeates. The third cell C yields 85 volume percent helium, with nitrogen as the major impurity. The total permeate is only about 1 volume percent of the natural gas feed. This small stream is then purified by a conventional rectifying system which (on the basis of same feed rate) is only about 1 percent as big as the FIGURE 1 rectification system.

To sum up the main features of FIGURE 1 process vs. FIGURE 2 process on the basis of a given feed rate:

(1) FIGURE 1 equipment is for handling 100% of the gas feedstream;

(2) FIGURE 1 process cannot be significantly improved due to thermodynamic limitations set by equilibrium constants between He and $N_2$, and the physical and economical limitations on insulation thickness, exchanger size, etc.

(3) FIGURE 2 purification equipment is sized for only 1 volume percent of feed;

(4) FIGURE 2 process can be greatly improved by advances in permeation film technology. Since the purification part of the FIGURE 2 process is only about 1% as large as the total FIGURE 1 process, there is room for improvement in 99% of the total FIGURE 2 process.

Thus, in accordance with the present invention helium is separated from a gaseous mixture in which it is present as a constituent by a two-stage permeation-cryogenic process. In the first stage the gas mixture of helium and at least one other gas is passed through a single or a plurality of permeation stages each of which comprises a high pressure side and a low pressure side separated by a thin, non-porous film having selective permeability for helium to produce "crude" helium, that is, a gas mixture containing about 50 to 90% preferably 70 to 85% by volume helium. Passage of the gas mixture through the permeation stage or stages is conducted by passing the gas mixture first to the high pressure side of the first permeation stage, removing gas enriched in helium from the low pressure side. Often the well head pressure is sufficient to effect the desired high pressure, otherwise, the gas mixture is compressed prior to introduction into the high pressure side of the first permeation stage. If a plurality of permeation stages are used, gas enriched in helium is removed from each low pressure side of subsequent permeation stages, compressed, and introduced into the high pressure side of the subsequent permeation stage, etc. until a crude helium, that is, a gas mixture containing the defined helium concentration is provided. After the first permeation stage, the portions of gas mixture on the high pressure side of the film which have not permeated are preferably removed, compressed and recycled to the high pressure side of the previous permeation stage.

This "crude" helium is then subjected to the second stage of the process of the invention which comprises purifying the crude helium by a cryogenic operation. This purification step comprises cooling the "crude" helium to liquify the other gas constituents in the "crude" or helium-enriched feed and thereby separating a helium produce having a purity of about 99% or more.

The fluid mixture from which the helium is recovered by the process of the present invention can contain a minor portion, e.g. about 0.1 to 25% of helium, usually about 0.5 to 3%. Ordinarily the feed is natural gas since this is where helium most often occurs. Illustrative of gases with which helium can be in admixture and separated by the process of this invention are, for instance, nitrogen, gaseous hydrocarbons, carbon monoxide, argon, oxygen or mixtures thereof.

The permeation process of the two-stage system of the present invention has as its basis the process wherein molecules of helium under pressure move through certain films or membranes at higher rates than do other gases with which it may be in admixture. Generally, the films or membranes involved are thin thermoplastic materials about 0.1 to 5 mils thick, often about 1 mil thick, which is about 10,000 to 1,000,000 times the dimensions of the diffusing molecules. The films should be non-porous, that is, free from any pin holes or other defects that destroy their continuity and permit the gas mixture to leak rather than permeate through the membrane or film. Examples of suitable films are plastic sheets such as polyethylene, polyester resin, nylon, polytetrafluoroethylene, fluorinated ethylene-propylene copolymer, polystyrene, ethyl cellulose and the like.

The form or design of the film can be any of those of the art. For instance, it can be a film package of compact form such as described in copending application Ser. No. 143,328, filed Oct. 6, 1961, now U.S. Pat No. 3,266,223; the film cell employed in the Linde process which is described in the Oil and Gas Journal of Apr. 22, 1963, and Chemical and Engineering News of Apr. 29, 1963; or it can have the relatively simple straight film design shown in U.S. Patent No. 2,540,152.

In order to effect permeation of the helium through the film, it is necessary that a pressure differential exist across the film. Although, the greater the differential the more effective the permeation, there is maximum pressure drop that can be utilized and this will be governed by the strength of the particular film employed and its ability to resist rupture. The pressure on the high pressure side of the film or membrane is maintained at a pressure well above atmospheric usually at least about 100 p.s.i.g., preferably about 500 to 2500 p.s.i.g. or more while the pressure on the low side of the film is conveniently kept at or near atmospheric. Natural gas well head pressures are often satisfactory for application to the high pressure side of the initial film cell.

The rate at which the compressed gas mixture flows across the film will vary depending upon the particular film being utilized, the absolute permeability and selectivity of the film, the area of film employed in each permeation, the number of permeation stages necessary, compression costs, etc. A flow rate is selected which under the conditions, including acceptable economic considerations, will provide a helium concentrate of 50% to 90%, preferably 70 to 85%, out of the final stage.

To obtain "crude" helium (i.e. having a purity of about 50 to 90%) from a gas mixture in which the helium is present in an amount of no more than about 2% by volume as, for instance, in natural gas, a multi-stage permeation will ordinarily be required, although with gas mixtures of greater helium concentration and/or highly efficient films, a single stage permeation may be all that is required.

In the cryogenic stage of the present invention, the "crude" helium removed from the low pressure side of the last permeation stage is recompressed to a suitable pressure, usually at least about 500 p.s.i.g., preferably 2,000 p.s.i.g. to 3,000 p.s.i.g. or more and chilled preferably to below minus 300° F. to condense the non-helium constituents which will be essentially nitrogen where natural gas is the helium-containing feed. In a preferred embodiment, the compressed gas mixture is subjected to successive coolings or liquefaction, the latter at a lower chilling temperature than the first and the helium product separated from the second liquefaction is then passed through any appropriate molecular sieve purifiers as a final treatment.

The invention will be better understood by the following example which will be described with reference to FIGURE 2.

A natural gas feed containing 1.3% helium is passed to a preheater 3, heated to 200° F. and passed to the first of a series of 3 permeation cells at a rate of 10,000,000 s.c.f./day and a pressure of 900 p.s.i.g. An operating temperature higher than ambient is used because permeation rates increase with temperature. The 200° F. temperature was chosen because polytetrafluoroethylene has been successfully used in a laboratory permeation test at 200° F. and 500 p.s.i.g. The permeation stages are kept at 200° F. by heat of compression. The permeation cells utilized can be those described in copending application S.N. 143,328, filed Oct. 6, 1961.

The permeation cells are illustrated diagrammatically as A, B, and C and contain 200,000, 100,000 and 2,500 square feet of polytetrafluoroethylene film, respectively. Each of the cells contains a number of high pressure and low pressure sides separated by the film which sides are simply represented in the drawing as a single high pressure side H, and a single low pressure side L, separated by the film 6. In each cell the high pressure side is maintained at 900 p.s.i.g. and the low pressure side at 35 p.s.i.g. The preheated compressed feed is introduced via line 9 into the high pressure side H of permeation cell A and passed into contact with the film 6. High pressure gas which does not permeate the film is conducted out of the cell by line 12. The portion of the gas which has permeated through the film contains about 9.2% helium and is removed from the low pressure side by means of line 15, compressed to 900 p.s.i.g. in compressor 18 and introduced into the high pressure side H of permeation cell B by line 21 along with 500,000 s.c.f./day of recycle from cell C at a total rate of 1,310,000 s.c.f./day. High pressure exhaust gases are withdrawn from permeation cell B via line 24 at a pressure of 850 p.s.i.g., compressed in compressor 27 and recycled to line 9 at a rate of 740,000 s.c.f./day by means of line 30. The gas that permeates film 6 in permeation cell B contains 26.7% helium, and is withdrawn via line 33, compressed in compressor 36 and delivered by line 39 into the high pressure side of permeation cell C at a rate of 570,000 s.c.f./day. Exhaust gas from the high pressure side H of the permeation cell C is removed by line 43, compressed in compressor 46 and recycled via line 49 to line 21. "Crude" helium containing 84.6% helium is removed through line 52 from the low pressure side L of permeation cell C at a rate of 60,000 s.c.f./day.

The "crude" helium obtained by this 3-stage permeation operation is then purified by the following cryogenic process:

The helium of 84.6% purity is sent via line 54 to compressor 58 where it is compressed to a pressure of 2025 p.s.i.g. and passed through heat exchanger 59. Leaving the heat exchanger, the compressed "crude" helium is directed by line 61 into cooler 64 maintained at a temperature of −320° F. to liquify the non-helium constituents which in this case are essentially nitrogen. Chilling of the cooler is effected by refrigerant nitrogen which enters via line 67, circulates around cooler 64 and exits via line 70. The condensate from cooler 64 is removed by line 73 and sent to flash drum 76 where helium is separated as overhead. The helium overhead is then directed to a second cooler 79 maintained at a temperature of −340° F. also by refrigerant nitrogen directed to the cooler by line 79a and away from the cooler by line 81. The partially liquified effluent from cooler 79 is directed by line 79b to flash drum 84 where helium is taken overhead and sent via lines 86, 87 and 88 into one of the molecular sieve purifiers 90 and 91. One of these purifiers is in operation while the other is being regenerated. Purified helium, that is, 99%+ purity, exits the molecular sieve via lines 90a or 91a and directed by line 94 back through heat exchanger 59. Upon exiting the heat exchanger 59, the helium is directed via line 96 to serve as a refrigerant for cooler 98 and recovered as a product via outlet 100 at a rate of 60,000 s.c.f./day.

The rest of the cryogenic portion of the drawing represents the system by which the separated nitrogen is cooled to temperatures enabling its use in the refrigeration of coolers 64 and 79 and in the removal of helium not separated from the nitrogen.

Condensed nitrogen is removed from flash drums 76 and 84 by lines 110 and 112 respectively and then by line 115 to a helium-nitrogen separator 117 maintained at a pressure of 50 p.s.i.g. Helium is taken as overhead and recycled by means of line 120 and 122 to line 54 and compressor 58. Liquid nitrogen containing dissolved helium is removed from the bottom of separator 117 and directed by line 119 to recycle line 130 entering heat exchanger 123 via line 124. Refrigerant gas used to chill coolers 64 and 79 flows via lines 70 and 81 respectively to recycle line 130. The recycled nitrogen along with the liquid nitrogen from line 119 flows through heat exchanger 123 and then via line 125 is taken to heat exchanger 127. After passing through heat exchanger 127, the warmed nitrogen flows by means of line 129 to compressor 131 where it is compressed to 600 p.s.i.g. and redirected by way of line 133 to cooler 98. The cooled nitrogen flows through heat exchangers 127 and 123 being directed thereto by lines 135 and 136, respectively and thence through a Joule-Thomson type expansion valve 200 and into flash drum 137. Vapor release from flash drum 137 enters recycle line 130 via line 201. A portion of the nitrogen is diverted from line 136 and expanded in expander 140 to 25 p.s.i.g., which corresponds to about −310° F. and joined by line 141 with the −320° F. vapor nitrogen of recycle line 130 being introduced into heat exchanger 123.

Liquid nitrogen in storage tank 137 which is at a temperature of −320° F. is removed from the bottom thereof, sent by line 145 and thence by lines 67 and 79a to cooler 64, cooler 79, respectively, and by line 154 to molecular sieve vessels 90 and 91.

What is claimed is:

1. A process for the recovery of helium from a gaseous mixture containing less than about 25% of the same which consists essentially of passing said helium-containing gaseous mixture through a permeation stage which consists essentially of a high pressure side and a low pressure side separated by a thin, non-porous film having selective permeability for helium, said passage through said permeation stage being conducted by first compressing said helium-containing gas, passing said gas mixture to the high pressure side of the permeation stage, removing helium-enriched gas from said low pressure side to provide a helium-enriched gas stream containing about 50% to 90% helium, compressing said helium enriched gas and cooling it to liquefy the non-helium constituents and thereby separating helium from the liquid.

2. A process for the recovery of helium from a natural gas mixture containing a minor amount of the same and nitrogen which consists essentially of passing said helium-containing gaseous mixture through a plurality of permeation stages each of which consists essentially of a high pressure side and a low pressure side separated by a thin, non-porous film having selective permeability for helium, said passage through said permeation stages being conducted by first compressing said helium-containing natural gas, passing said compressed gas mixture to the high pressure side of the permeation stage, removing helium-enriched gas from the low pressure side, compressing the helium-enriched gas and introducing it into the high pressure side of the subsequent permeation stage, repeating said removal, compression, and passage of said helium-enriched gases to subsequent permeation stages to produce a helium-enriched gas containing about 70% to 90% helium, compressing said latter helium-enriched gas and cooling it to liquefy the nitrogen constituent and thereby separating pure helium from the liquid.

References Cited

UNITED STATES PATENTS

| 2,151,299 | 3/1939 | Miller | 62—11 |
| 3,019,853 | 2/1962 | Kohman et al. | 55—16 |
| 3,126,266 | 3/1964 | Meisler. | |

REUBEN FRIEDMAN, *Primary Examiner.*

J. ADEE, *Assistant Examiner.*